United States Patent
Kokubo (10) Patent No.: US 7,031,675 B2
(45) Date of Patent: Apr. 18, 2006

(54) FM TRANSMITTER

(75) Inventor: Masaru Kokubo, Hanno (JP)

(73) Assignee: Renesas Technology Corp., Tokyo (JP)

( * ) Notice: Subject to any disclaimer, the term of this patent is extended or adjusted under 35 U.S.C. 154(b) by 561 days.

(21) Appl. No.: 10/067,234

(22) Filed: Feb. 7, 2002

(65) Prior Publication Data

US 2002/0132595 A1 Sep. 19, 2002

(30) Foreign Application Priority Data

Mar. 14, 2001 (JP) ............................. 2001-071641

(51) Int. Cl.
*H01Q 11/12* (2006.01)

(52) U.S. Cl. ......................... 455/119; 455/113; 331/14; 331/17

(58) Field of Classification Search .................. 455/91, 455/93, 110, 111, 112, 113, 118, 119, 75, 455/76; 331/10, 14, 16, 17, 25
See application file for complete search history.

(56) References Cited

U.S. PATENT DOCUMENTS

| | | | | |
|---|---|---|---|---|
| 4,110,707 A * | 8/1978 | Giolma et al. | ............... | 332/127 |
| 4,609,886 A * | 9/1986 | Takaki et al. | ................ | 332/127 |
| 4,980,652 A * | 12/1990 | Tarusawa et al. | ........... | 331/1 A |
| 5,126,692 A * | 6/1992 | Shearer et al. | .................. | 331/8 |
| 5,151,665 A * | 9/1992 | Wentzler | ........................ | 331/8 |
| 5,379,002 A * | 1/1995 | Jokura | ........................... | 331/10 |
| 5,428,317 A * | 6/1995 | Sanchez et al. | ............. | 331/1 A |
| 5,499,392 A * | 3/1996 | Grunwell | ...................... | 455/260 |
| 6,069,537 A * | 5/2000 | Kim et al. | .................... | 332/119 |
| 6,115,586 A * | 9/2000 | Bezzam et al. | ............. | 455/112 |
| 6,133,770 A * | 10/2000 | Hasegawa | .................... | 327/156 |
| 6,163,184 A * | 12/2000 | Larsson | ...................... | 327/156 |
| 6,163,711 A * | 12/2000 | Juntunen et al. | ............ | 455/557 |
| 6,211,740 B1* | 4/2001 | Dai et al. | ....................... | 331/2 |
| 6,223,061 B1* | 4/2001 | Dacus et al. | ................. | 455/574 |
| 6,246,864 B1* | 6/2001 | Koike | ......................... | 455/110 |
| 2001/0036239 A1* | 11/2001 | Oka | ............................. | 375/376 |

FOREIGN PATENT DOCUMENTS

JP 03-236634 10/1991

* cited by examiner

*Primary Examiner*—Sonny Trinh
*Assistant Examiner*—Sam Bhattacharya
(74) *Attorney, Agent, or Firm*—Antonelli, Terry, Stout and Kraus, LLP.

(57) ABSTRACT

An FM transmitter that can control start/idle of each of such devices as a buffer amplifier without using a sample-and-hold circuit for moving a PLL into open loop control, wherein a controller that controls a charging pump in the PLL to start/idle the FM modulation is controlled with use of a closed/open loop select signal of the PLL, a start/idle signal of the buffer amplifier, and a preamble detection signal. The power consumption of the FM transmission can be reduced, since both the buffer amplifier and the PLL in the FM transmitter can be started/idled together in a ganged manner.

13 Claims, 9 Drawing Sheets

FM TRANSMITTER

FIELD OF THE INVENTION

The present invention relates to a transmitter that uses a Frequency Modulator (FM) circuit formed on a semiconductor substrate, hereinafter referred to as an FM transmitter.

BACKGROUND OF THE INVENTION

As described in JP-A No. 236634/1991, conventional FM transmitters for transmitting FM modulation signals use phase lock loops (PLL).

Typically, such an FM transmitter is composed of a reference oscillator, a phase comparator, a programmable frequency divider, a low pass filter (L.P.F), a sample-and-hold circuit, an adder, a voltage controlled oscillator (VCO), a buffer amplifier (AMP), and a transmission antenna. Operation of such a typical FM transmitter is described below.

The output of the voltage controlled oscillator is divided by the programmable frequency divider and entered to one input terminal of the phase comparator. A reference signal is then supplied to the other input terminal of the phase comparator from the reference oscillator. The phase comparator outputs a signal having a pulse width equivalent to a phase difference between the above two signals. The output signal of the phase comparator is fed back to the frequency control terminal of the voltage controlled oscillator via the low pass filter, the sample-and-hold circuit, and the adder. The PLL is composed of a series of the connections among the devices. Due to the feedback configuration, the frequency of the signal output from the voltage controlled oscillator becomes a frequency obtained by multiplying the reference signal by the frequency division number of the programmable frequency divider.

The conventional FM transmitter is also provided with a microcomputer that receives signals from the phase comparator and the programmable frequency divider. The microcomputer detects a locked PLL with a signal received from the phase comparator. The microcomputer then starts up the sample-and-hold circuit according to the detection of the locked PLL and holds as a sample the control voltage of the voltage controlled oscillator used while the PLL is locked. After that, the frequency control signal obtained from transmit data is added up by the adder via a digital/analog converter and a low pass filter, whereby an FM modulation signal is obtained. The low pass filter, used to convert the output of the phase comparator to DC signals required for the voltage controlled oscillator in the PLL, is referred to as a loop filter. In addition, the FM modulation signal generated from the voltage controlled oscillator is supplied to the antenna via the buffer amplifier, whereby FM modulation signals are transmitted.

The conventional FM transmitter uses a sample-and-hold circuit so as to cut the closed PLL and moves the PLL into an open loop control state. The adder is used to add the sample-held output voltage of the loop filter to a signal that causes a frequency offset corresponding to a transmission signal, thereby generating an FM modulation signal. At this time, because the sample-and-hold circuit is controlled according to a lock signal output from the phase comparator and detected by the microcomputer, the FM transmitter can be moved into a state in which an FM modulation signal is generated automatically when the PLL is locked.

In the conventional FM transmitter, however, no consideration is given to the controlling of the start-up of the buffer amplifier, resulting in the FM transmitter being high in power consumption. Likewise, the conventional FM transmitter, because of its requirement of a sample-and-hold circuit to move the PLL into open loop control, causes the power consumption to increase.

SUMMARY OF THE INVENTION

Under the circumstances, it is an object of the present invention to provide an FM transmitter that can control the start/idle of each of its devices, including the buffer amplifier therein, thereby omitting the use of a sample-and-hold circuit that moves the PLL into open loop control. It is another object of the present invention to provide an FM transmitter that can minimize the start-up time of the buffer amplifier that requires large power consumption.

In order to achieve these and other objects, the FM transmitter of the present invention comprises: a phase lock loop (PLL) including a phase comparator, a charging pump, a loop filter, a voltage controlled oscillator, a counter, an adder for adding up a frequency shift corresponding to a transmission signal, and a buffer amplifier for outputting signals to an antenna.

The FM transmitter is also provided with a controller that receives the start/idle signals of both of the PLL and the buffer amplifier and outputs control signals for keeping the output of the charging pump in a high resistance state. In other words, the FM transmitter of the present invention controls the start/idle of the modulation by the FM transmitter (hereinafter, to be described simply as an FM modulation) with use of the closed/open loop select signal of the PLL, as well as the start/idle signal of the buffer amplifier.

Note that the PLL closed/open loop select signal is used to control the closed/open loop operation of the PLL. The signal may not only be a signal output due to the locked PLL detection by a microcomputer like in the conventional cases, but also be a signal for denoting the PLL locked state due to elapsed time detection by, e.g., a counter.

An FM transmitter that uses a preamble signal may be composed so as to generate the start/idle of the FM modulation with the PLL closed/open loop select signal, the buffer amplifier start/idle signal, and the preamble detection signal. This allows the PLL to generate an FM signal at an FM modulation in a closed loop before preamble detection, and also allows the PLL to be moved into an FM modulation in an open loop after the end of preamble transmission. In short, the FM transmitter is composed such that the PLL makes closed loop control while the FM transmitter is sending the preamble signal.

In the FM transmitter, the controller may be so composed as to block the output of the charging pump or to suppress the two frequency control signals output from the phase comparator, the two signals defining the control signals for increasing the frequency and for decreasing the frequency. This enables the PLL to shift from a closed loop operation to an open loop operation with no use of a sample-and-hold circuit that is required in the conventional example.

Other and further objects, features and advantages of the invention will appear more fully from the following description.

BRIEF DESCRIPTION OF THE DRAWINGS

A preferred form of the present invention is illustrated in the accompanying drawings in which.

DETAILED DESCRIPTION OF THE PREFERRED EMBODIMENTS

Hereunder, the preferred embodiments of the present invention for an FM transmitter will be described in detail with the accompanying drawings.

First Embodiment

Figure 1:
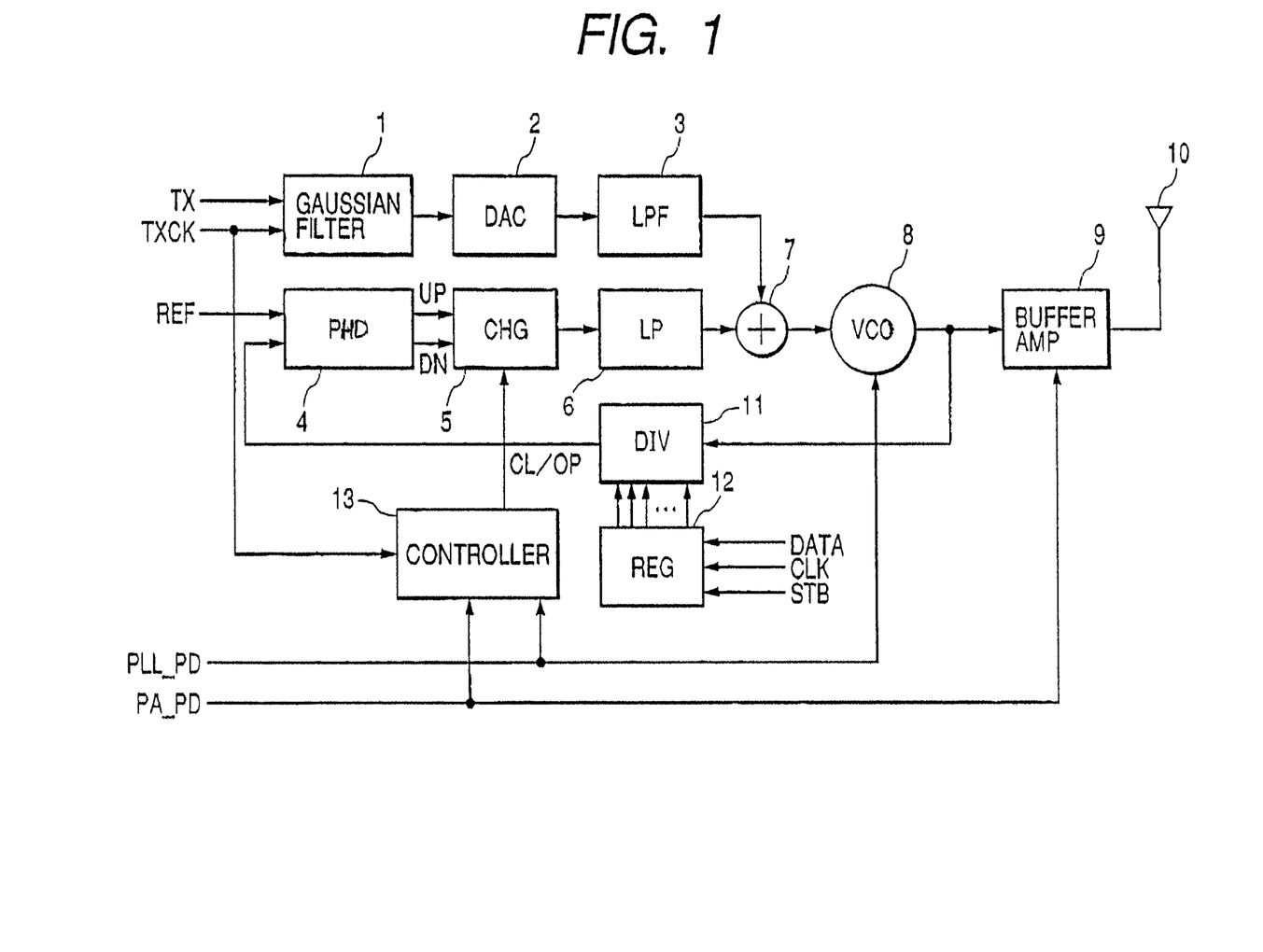
FIG. 1 is a block diagram of an FM transmitter in accordance with a first embodiment of the present invention.

FIG. 1 shows a block diagram of an FM transmitter in the first embodiment of the present invention.

The FM transmitter shown in FIG. 1 comprises a phase comparator (PHD) 4 for receiving a reference signal REF so as to detect a phase difference from a signal returned from a voltage controlled oscillator (VCO) 8 via a counter 11; a charging pump 5 for receiving a control signal UP used to increase a frequency output from the phase comparator 4 or a control signal DN used to decrease the frequency so as to convert the signal (UP/DN) to a signal equivalent to the phase difference detected by the phase comparator 4; a loop filter (LP) 6 for receiving a signal from the charging pump 5 so as to suppress the noise component included in the output signal and keep the PLL stable; an adder 7 for adding up the output from the loop filter (LP) 6 and transmit data TX; and a VCO 8 for receiving a signal from the adder 7 so as to output a signal of an oscillation frequency corresponding to the signal value. With this configuration of the FM transmitter, the output from the VCO 8 is divided into two signals so that one signal is entered to the counter 11 that counts up to a predetermined value and the other signal is output from an antenna 10 as an FM modulation signal via a buffer amplifier (AMP) 9.

Such a feedback loop composed of the phase comparator 4, the charging pump 5, the loop filter 6, the VCO 8, and the counter 11 is referred to as a PLL (Phase Lock Loop).

A signal is then applied to the above PLL and the following configuration is required so as to output the signal. Concretely, both transmit signal TX and synchronization clock TXCK are entered to a Gaussian filter 1 and their pulses are shaped there. After that, the shaped signal is converted to an analog signal by a DA converter (DAC) 2. This analog signal, after its high frequency noise is suppressed by a low path filter 3, is supplied to the other input of the adder 7. The predetermined value up to which the counter 11 counts is stored in a register 12 beforehand so that it is rewritten from an external controller with use of three signals DATA, CLK, and STB. A closed loop/open loop select signal from a controller 13, that is, a control signal CL/OP is entered to the charging pump 5, so that the PLL is switched between an open loop operation and a closed loop operation, which is executed by cutting off the feedback loop of the PLL.

Figure 3:
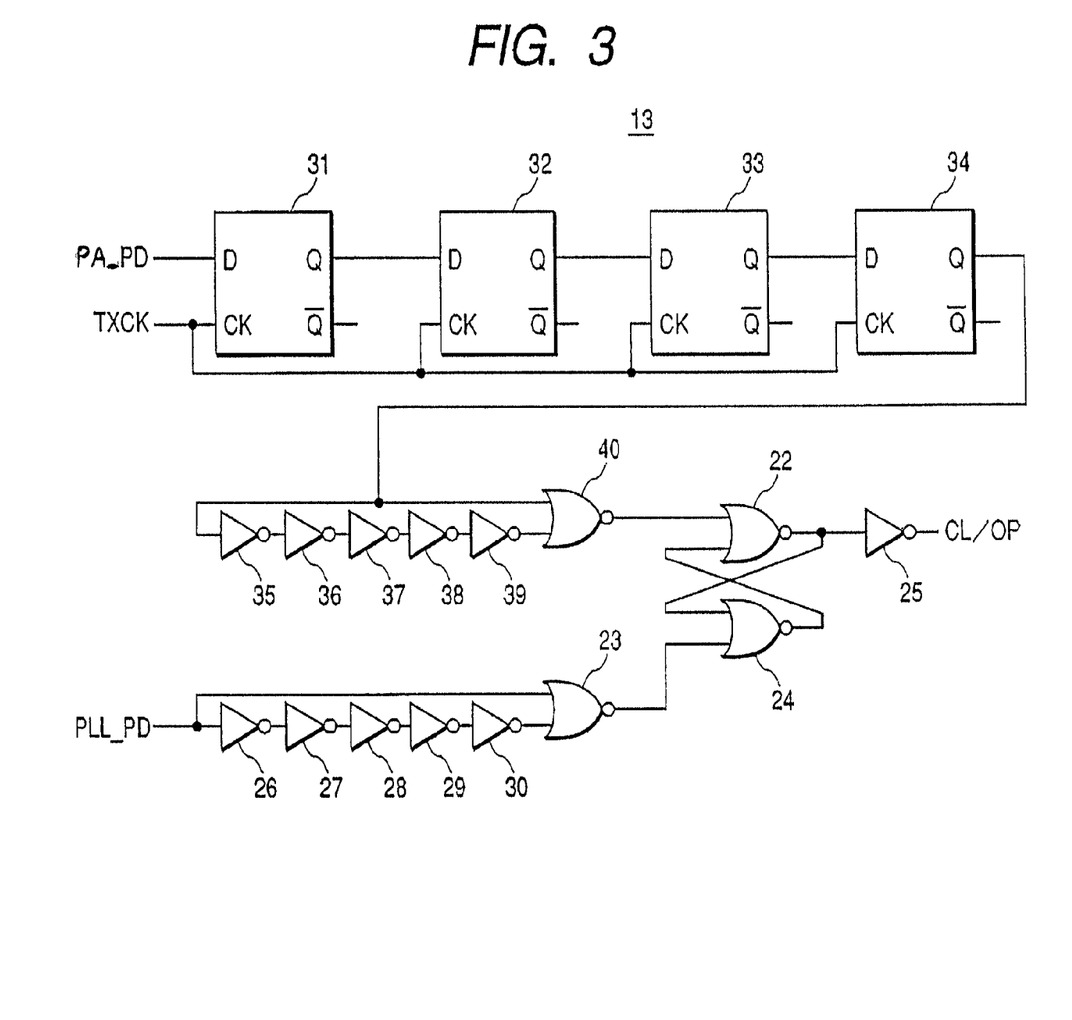
FIG. 3 is a circuit diagram of a controller employed for the FM transmitter in FIG. 1.

FIG. 3 shows an example of a configuration that can be used for the controller 13 of FIG. 1.

The controller 13 shown in FIG. 3 is composed of a plurality of delay registers 31 to 34 for receiving a signal PA_PD used to start up the buffer amplifier 9; a plurality of delay inverters 35 to 39 and a NOR circuit 40 for receiving a signal output from the last-stage delay register 34 and outputting a pulse at the trailing edge of the output signal; a plurality of delay inverters 26 to 30 and a NOR circuit 23 for receiving a signal PLL_PD used to start up the PLL and outputting a pulse at the trailing edge of the PLL_PD ; a plurality of NOR circuits 22 and 24 composing a flip-flop circuit; and an inverter 25 for inverting an output from the NOR circuit 22 so as to output the inverted signal.

While four delay registers are used in the case shown in FIG. 3, the number of delay registers may be varied so as to obtain another required delay time. The delay registers are replaceable with variable delay circuits used to obtain a delay, respectively. The required delay time mentioned above is, e.g., a certain time or more than the time required for reducing the fluctuation of the PLL target frequency to be generated when the buffer amplifier 9 is started up.

In the above description, solely for purposes of example, it is defined that the buffer amplifier 9 is started up when the PA_PD signal is "Low (L)" and idle when the signal is "High (H)". In addition, the VCO 8 is also controlled by the PLL_PD signal so that it is idle at "H" and started up at "L". It is also premised in this case that the PLL-PD signal is used to start up/idle other blocks, although control lines of those blocks are omitted in FIG. 3.

Next, the operation of the FM transmitter in this first embodiment will be described with reference to FIG. 7.

Figure 7:
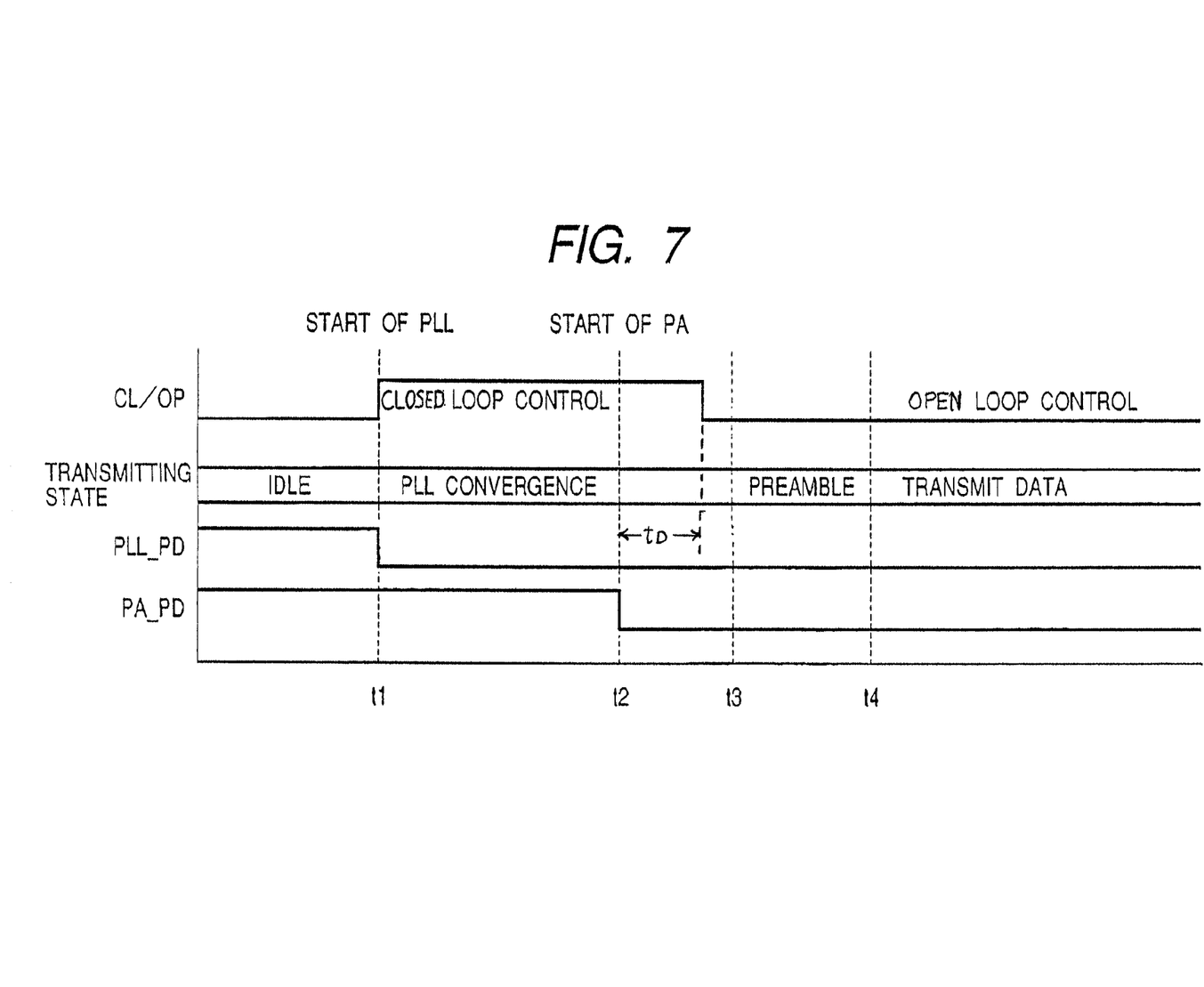
FIG. 7 is a control timing chart of the FM transmitter shown in FIG. 1.

In FIG. 7, the horizontal axis denotes the time and the transmission states of the FM transmitter, which is controlled by three control signals CL/OP, PLL_PD , and PA_PD corresponding to the time. The transmission states of the FM transmitter in this case are four modes; idle, PLL convergence, preamble transmission, and data transmission.

The first transmission state is the idle mode in which both PLL_PD and PA_PD signals become "H" in level and the FM transmitter is idle.

The PLL_PD signal is then shifted from "H" to "L", whereby the PLL is started up. At this time, the controller 13 detects a shift of the PLL_PD signal, and, correspondingly, shifts the control signal CL/OP from "L" to "H"(at the time t1 in FIG. 7) and the PLL is moved into closed loop control and begins settlement into the locked state. The shift of the PLL_PD signal can be detected actually as follows; the PLL_PD signal is entered to odd-numbered inverters among inverters 26 to 30 so as to obtain a predetermined delay time, thereby making a negative operation to calculate the OR of the output from the last-stage inverter 30 and the PLL_PD signal so that a positive pulse is output at the trailing edge of the PLL_PD signal. This output is entered to the two NOR circuits 22 and 24 connected to each other so as to compose a flip-flop circuit. The output of the flip-flop is thus inverted. Consequently, the level of the control signal CL/OP passing the inverter 25 is shifted from "L" to "H". While five inverters are used in this embodiment, the number of inverters may be varied so as to obtain another required pulse width.

After the PLL is locked, the level of the PA_PD signal is shifted from "H" to "L" (at the time t2 in FIG. 7) so as to start up the buffer amplifier 9. At this time, a dedicated locked state detector may be used for detecting the locked PLL. And, as well known, the settling time can be decided by a natural frequency ωn decided when PLL parameters are specified. It is also possible to employ a method for shifting the PA_PD signal in level after a certain time with use of a timer.

A power supply and/or a ground potential in other blocks than the buffer amplifier 9 are fluctuated by a surge current of the buffer amplifier 9, generated when the level of the PA_PD signal is shifted from "H" to "L". The buffer amplifier 9 is thus started up. Especially because the PLL of the FM transmitter is apt to be affected by this surge current, the oscillation frequency of the PLL is fluctuated from the target frequency. This is why the controller shown in FIG. 3 is provided with a plurality of delay registers employed for delay circuits. With use of those delay registers, the FM transmitter is prevented from moving into open loop control until this frequency fluctuation settles again within a predetermined frequency range.

The output from the last-stage delay register 34 is entered to the odd-numbered ones among inverters 35 to 39 and one input of the NOR circuit 40 while the output of the last-stage inverter 39 is connected to the other input of the NOR circuit 40. With this circuit configuration, a positive pulse is output at the trailing edge of the signal obtained by delaying the PA_PD signal. And, the output of this NOR circuit 40 is connected to the other input of each of the two NOR circuits 22 and 24 combined so as to form a flip-flop circuit, and the output of the flip-flop circuit is inverted. This output is output via the inverter 25 as the control signal CL/OP, whereby the level of the control signal CL/OP is shifted from "H" to "L". Consequently, the feedback loop of the PLL is shut off, so that the FM transmitter begins open loop control. As shown in the time chart in FIG. 7, the FM transmitter is moved from closed loop control into open loop control at a timing delayed by the time tD of the delay registers 31 to 34.

After the open loop control begins, both preamble signal and transmit data are entered to the adder 7 via the gaussian filter 1, the DAC 2, and the low pass filter 3 so as to be added to the input of the VCO 8, then output from the VCO 8 as an FM modulation signal. The preamble signal at this time is a repetition of specific patterns such as −1, +1, −1, +1, etc. ruled in the specification. Especially in the specification of a short range wireless link referred to as a short range wireless LAN (Local Area Network), two preamble types of signals −1, +1, −1, +1 or +1, −1, +1, −1 are defined. The +1 represents a positive frequency shift and the −1 represents a negative frequency shift. And, the +1 corresponds to "H" and the −1 corresponds to "L" of digital signals, respectively. In FIG. 7, t3 denotes a preamble transmission starting point and t4 denotes a preamble ending point or transmit data starting point.

Next, the charging pump circuit will be described with reference to FIG. 5.

The charging pump 5 receives the control signal CL/OP output from the controller 13 and the control signal CL/OP can control the charge current of the charging pump 5 so as to enable the PLL to begin closed loop or open loop control in the subject control state.

The charging pump 5 comprises a reference power supply 41 for supplying a reference current Ic; an NMOS transistor 42 connected to the output terminal of the reference power supply 41 and formed so as to connect the drain and the source thereof to each other; NMOS transistors 47 and 48 formed so as to connect their gates to the gate of the NMOS transistor 42, respectively; a PMOS transistor 43 formed so as to connect the drain and the gate thereof to each other and the drain thereof to the drain of the NMOS transistor 48; a PMOS transistor 44 formed so as to connect the gate thereof to the gate of the PMOS transistor 43; a PMOS transistor 45 formed so as to connect the source thereof to the drain of the PMOS transistor 44 and the drain thereof to the charging pump output CHP; an NMOS transistor 46 formed so as to connect the source thereof to the drain of the NMOS transistor 47 and the drain thereof to the charging pump output CHP; a NAND circuit 49 enabled to receive the UP signal from the phase comparator 4 as one input and the CL/OP signal from the controller 13 as the other input; and an AND circuit 50 enabled to receive the DN signal from the phase comparator 4 as one input and the CL/OP signal from the controller 13 as the other input.

Figure 5:
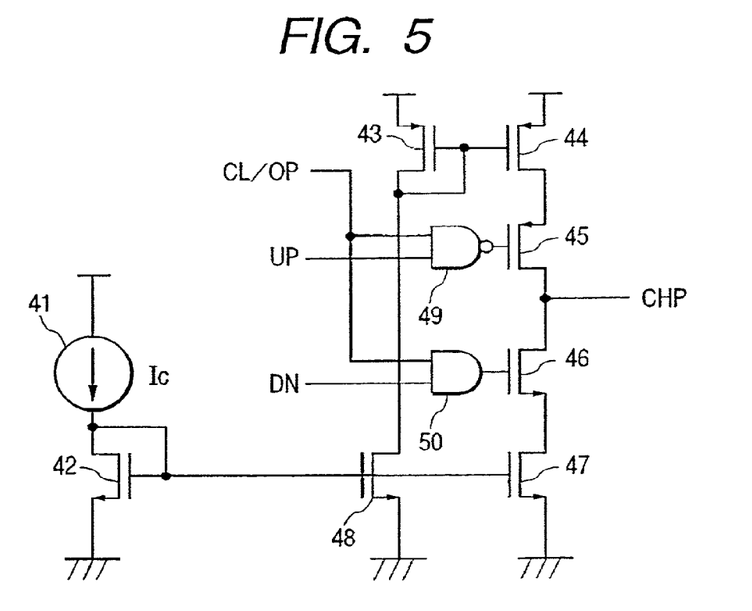
FIG. 5 is a circuit diagram of a charging pump employed for the FM transmitter shown in FIG. 1.

In FIG. 5, the gates of the NMOS transistors 42, 48, and 47 are connected to each another so as to compose a current mirror circuit. Consequently, the same current flows in the NMOS transistors 42, 48, and 47. The gates of the PMOS transistors 43 and 44 are also connected to each other so as to compose a current mirror circuit. Therefore, the same current flows in the two PMOS transistors 43 and 44. Consequently, the current value of the transistors 42, 43, 44, 47, and 48 is equivalent to the reference current Ic.

In addition, because the CL OP signal from the controller 13 is entered to both NAND circuit 49 and AND circuit 50, when the level of the control signal CL/OP is "L", the output of the NAND circuit 49 is fixed at "H" and the output of the AND circuit 50 is fixed at "L". Consequently, the PMOS transistor 45 whose gate is connected to the output of the NAND circuit 49 and the NMOS transistor 46 whose gate is connected to the output of the AND circuit 50 are turned off while the output CHP of the charging pump 5 is held in a high resistance state. At this time, the PLL begins open loop control.

On the other hand, when the level of the control signal CL/OP output from the controller 13 is "H", the NAND circuit 49 outputs a signal obtained by inverting the UP signal received from the phase comparator 4 and the AND circuit 50 outputs the same signal as the DN signal output from the phase comparator 4. Consequently, when the UP signal is "H" in level, the PMOS transistor 45 is turned on, whereby the current from the PMOS transistor 44 is supplied to the output CHP of the charging pump 5. When the DN signal is "H" in level, the NMOS transistor 46 is turned on, with the result that the current from the NMOS transistor 47 flows backward from the output CHP of the charging pump 5. Specifically, the charging pump current flows forward/backward in accordance with the UP/DN signal output from the phase comparator 4. Consequently, the PLL begins closed loop control in this state.

With the above configuration, it is possible to realize an FM transmitter that can control the buffer amplifier 9 and the PLL so as to be started and idled together in a ganged manner.

Second Embodiment

Next, the second embodiment of the FM transmitter of the present invention will be described with reference to FIG. 2.

This second embodiment differs from the first embodiment in that the controller 13 shown in FIG. 1 is replaced with a controller 14 provided with a preamble detector. The controller 14 receives four signals of the PLL_PD signal, the TX signal, the TXCK signal, and the PA_PD signal, and outputs the control signal CL/OP used to select closed loop/open loop control to the charging pump 5.

Figure 4:
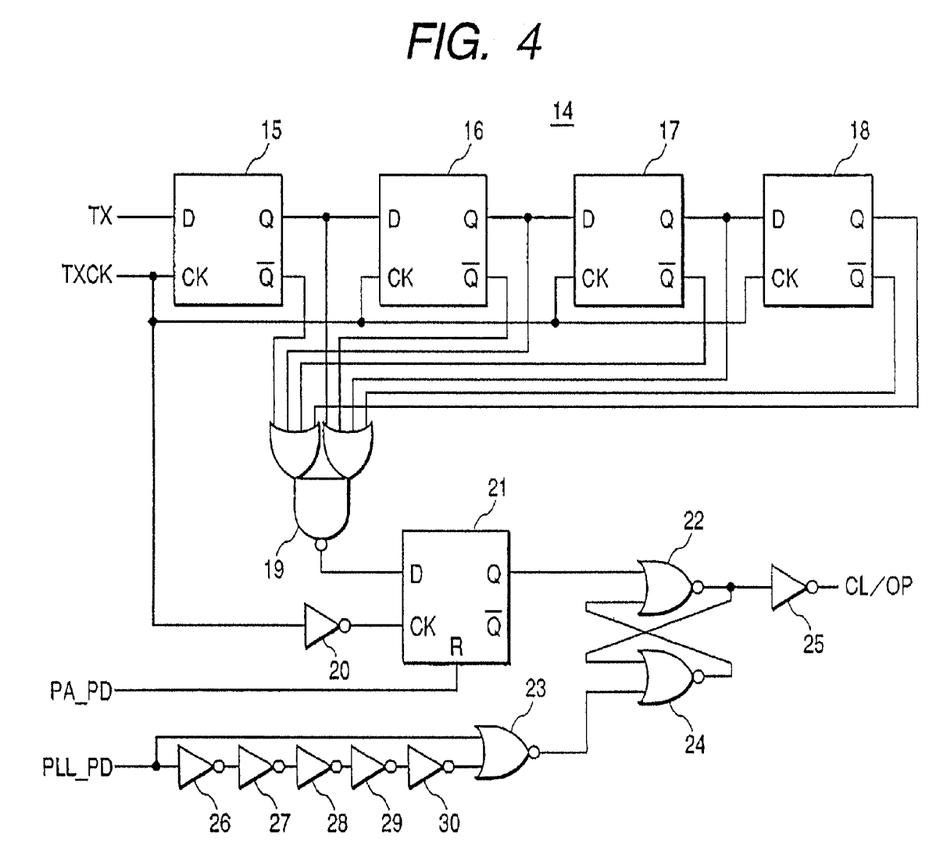
FIG. 4 is a circuit diagram of a controller employed for the FM transmitter shown in FIG. 2.

FIG. 4 shows a configuration of the controller 14 in this second embodiment.

The controller 14 comprises registers 15 to 18 for receiving transmit data TX and its synchronization clock TXCK so as to compose a shift register; an OR-NAND circuit 19 for checking whether or not transmit data TX matches with a preamble signal; an inverter 20 for inverting the synchronization clock TXCK; a register 21 for latching the output of the OR-NAND circuit 19; NOR circuits 22 and 24 combined so as to compose a flip-flop circuit whose output becomes "H" due to the output of the register 21; an inverter 25; odd-numbered inverters of those 26 to 30, which receive the PLL_PD signal, respectively; and a NOR circuit 23 for receiving the output of the last-stage inverter 30 and the PLL_PD signal. The signal output from the NOR circuit 23 is entered to the input terminal of the NOR circuit 24. In addition, the PA_PD signal is entered to the reset terminal R of the register 21.

Next, the operation of the controller 14 will be described.

When the FM transmitter is started up, the PLL_PD signal is shifted from "H" to "L" in level, thereby a one-shot pulse is output at the trailing edge due to the operations of the inverters 26 to 30 and the NOR circuit 23. The signal of the NOR circuit 23 is entered to the NOR circuit composed as a flip-flop circuit, so that the control signal CL/OP passing the inverter 25 is shifted to "H" in level. Consequently, the PLL begins closed loop control. The oscillation frequency thus settles at a predetermined value.

Next, the transmit data TX is entered to the register 15. The registers 15 to 18 are combined so as to compose a shift register, and the clock TXCK synchronized with the transmission signal is used as the transfer clock at this time. Consequently, the transmit data TX is transferred between transmission signals. The signal output from each of the transistors 15 to 18 is entered to the OR-NAND circuit 19. The Q signal output from the register 15, the Q inverted signal output from the register 16, the Q signal output from the register 17, and the Q inverted signal output from the register 18 are entered to one OR input of the OR-NAND circuit 19. And, the Q inverted signal output from the register 15, the Q signal output from the register 16, the Q inverted signal output from the register 17, and the Q signal output from the register 18 are entered to the other OR input terminal of the OR-NAND circuit 19. Due to the above connections, it is possible to detect existence of data (H, L, H, L or L, H, L, H) matching with a preamble signal in the transmit data TX. The output of the OR-NAND circuit 19 is then entered to the register 21 as an inverted clock of the clock TXCK. Thus, the FM transmitter is protected from hazard-caused malfunctions.

The Q output of the register 21 is connected to the input of the NOR circuit 22 used to compose the above flip-flop circuit. When matching with the preamble signal is detected, the flip-flop circuit is reset, whereby the level of the control signal CL/OP is shifted from "H" to "L". Consequently, the PLL begins open loop control.

Figure 8:
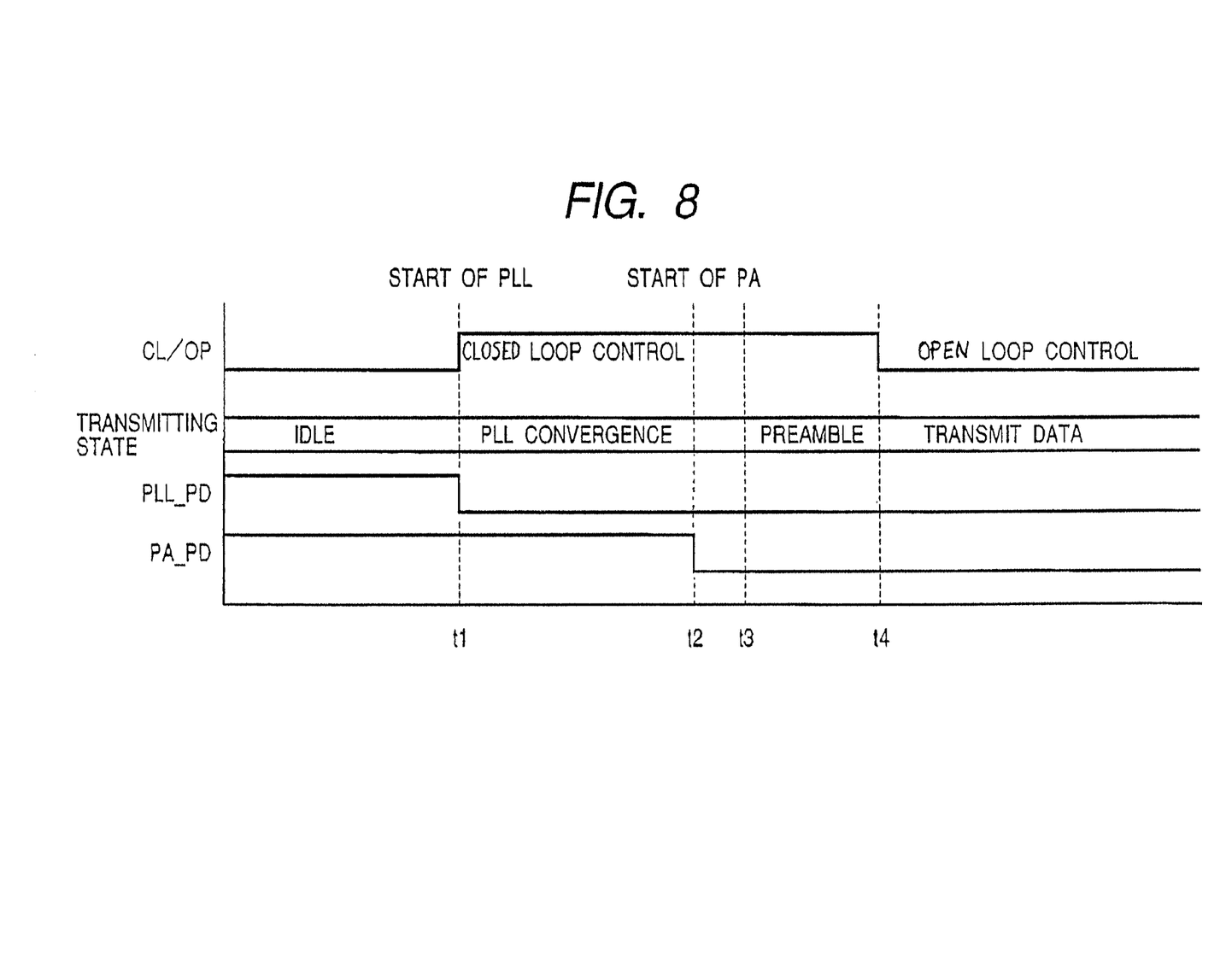
FIG. 8 is a control timing chart of the FM transmitter shown in FIG. 2.

FIG. 8 shows a control timing chart in this second embodiment. The control signal CL/OP enables the PLL to begin open loop control after the preamble signal is detected. The preamble signal is a repetitive signal for shifting a frequency from positive to negative, so the preamble signal is output repetitively in 500 kHz cycles. This frequency is high enough for the PLL loop band (natural frequency ωn), so that no signal is suppressed by the closed loop control. The FM modulation signal can thus be generated while the PLL is doing closed loop control. In FIG. 8, t3 denotes a starting point of preamble transmission and t4 denotes the ending point of preamble transmission or starting point of the transmit data state.

Figure 6:
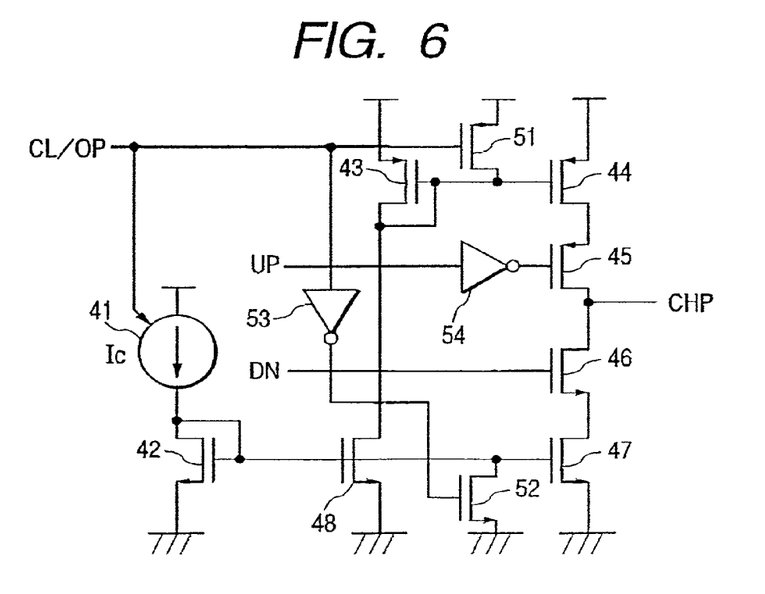
FIG. 6 is a circuit diagram of a charging pump employed for the FM transmitter shown in FIG. 2.

Next, the charging pump 5 in this second embodiment will be described with reference to FIG. 6.

The charging pump 5 in this second embodiment stops supply of a bias current so as to move the PLL into open loop control. Unlike the charging pump in the first embodiment, the supply of the reference current Ic in the charging pump in this second embodiment is started/idled by the CL/OP signal. In addition, the charging pump is further provided with an NMOS transistor 52 formed so as to connect the ground thereof to the gate of the NMOS transistor 42 and a PMOS transistor 51 formed so as to connect the power supply terminal thereof to the gate of the PMOS transistor 43, respectively, when the supply of the current Ic stops. Instead, the AND circuit 50 for receiving the control signal DN is deleted from the charging pump 5. In addition, the NAND circuit 49 formed so as to enter the control signal DN directly to the gate of the NMOS transistor 46 and enabled to receive the control signal UP is replaced with an inverter 54. And, the gate signal of the NMOS transistor 52 is entered to the gate of the NMOS transistor 52 when the CL/OP signal is inverted by the inverter 53.

The charging pump 5 in this embodiment makes normal operations according to the control signal UP/DN received from the phase comparator when the CL/OP signal is "H" in level. When the CL/OP signal is "L", however, the reference current Ic becomes zero (0) and the gate-source voltage becomes zero (0) in each of the NMOS transistor 47 and the PMOS transistor 44. Thus, no current flows forward/backward to/from the output CHP of the charging pump 5. Consequently, the PLL begins open loop control.

Third Embodiment

Next, the third embodiment of the FM transmitter of the present invention will be described.

Figure 2:
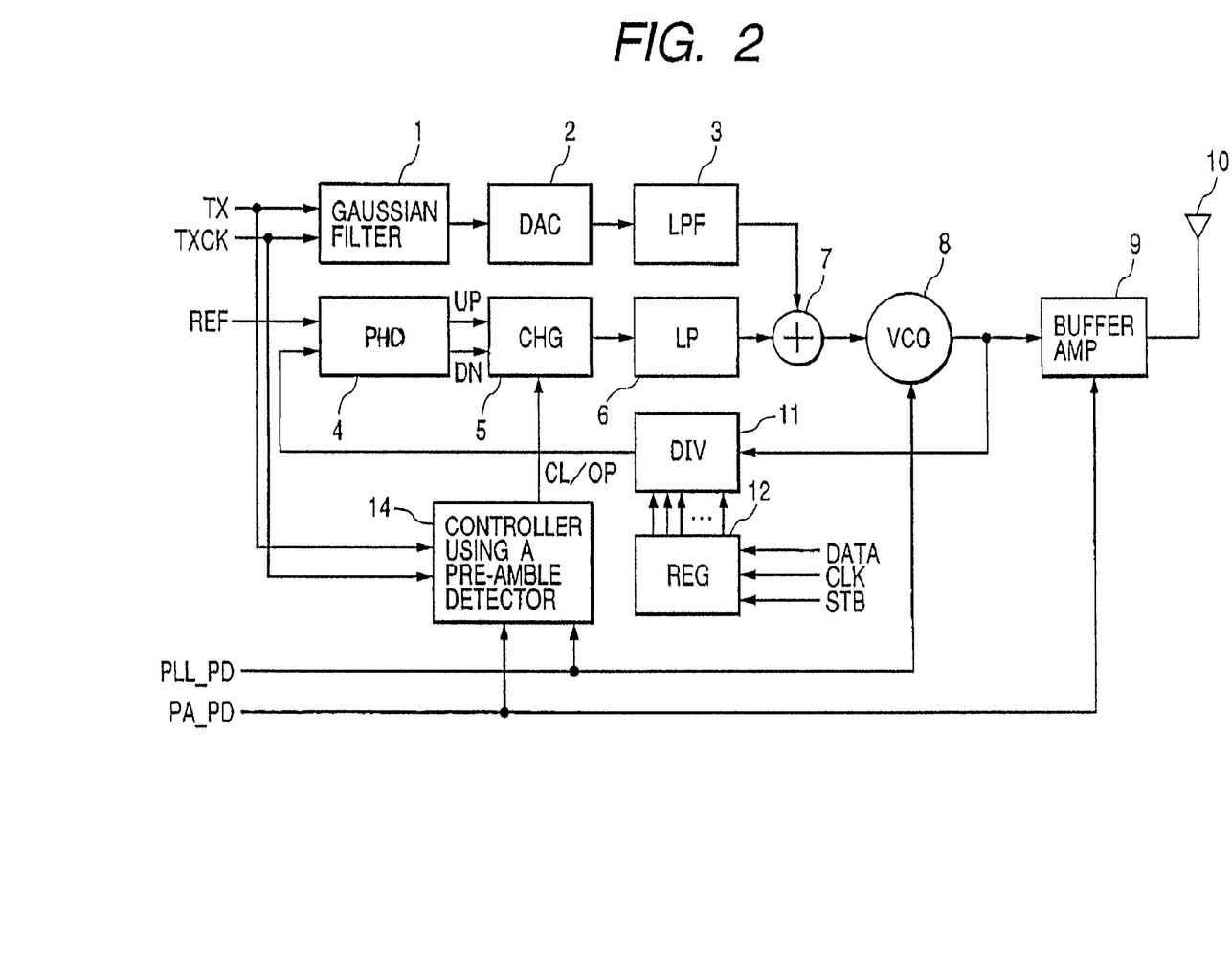
FIG. 2 is a block diagram of an FM transmitter in accordance with second embodiment of the present invention.

In this embodiment, the configuration of the controller 14 differs partially from that in the second embodiment, which is provided with a preamble detector as shown in FIG. 2.

Figure 9:
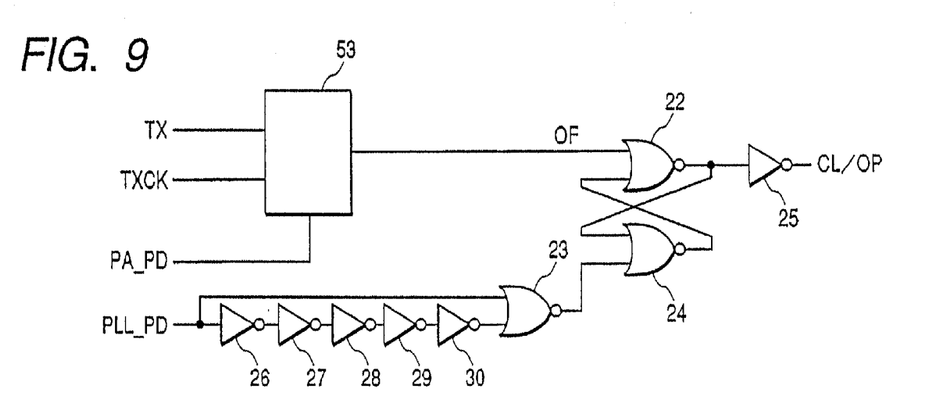
FIG. 9 is a circuit diagram of a controller provided with an offset detector and employed for the FM transmitter shown in FIG. 2.

FIG. 9 shows the configuration of the controller in this third embodiment. The controller shown in FIG. 9 receives the transmit data TX and the synchronization clock TXCK and assumes correspondence between "H" and +1 and between "L" and −1, respectively, so that the +1 and the −1 are integrated at each synchronization clock TXCK. The controller is provided with an offset detector 53 that outputs an "H" offset detection signal OF when the absolute value of the integration result exceeds a predetermined threshold. This offset detector 53 is reset by the PA_PD signal, so that the signal OF becomes "L" in level.

The control signal CL/OP is set by the PLL_PD signal. The timing at which closed loop control begins is the same as that of the controllers 13 and 14 in the above embodiments. However, the controller 14 in this embodiment differs from the controllers in other embodiments in that the timing at which closed loop control is shifted to open loop control when the above detector 53 detects an offset between the number of the detected "H" transmission signals "H" and that of "L" transmission signals.

Figure 10:
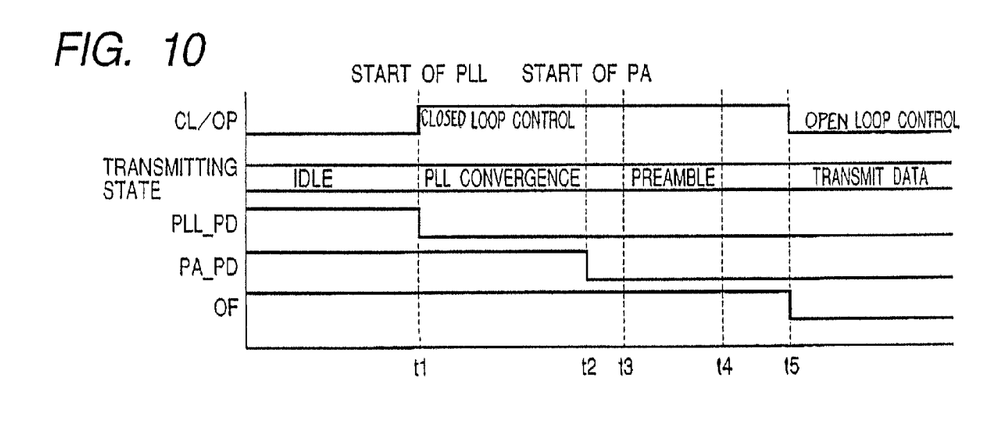
FIG. 10 is a control timing chart of the FM transmitter provided with the controller shown in FIG. 9.

FIG. 10 shows a timing chart employed when the controller composed as shown in FIG. 9 is used. As shown in FIG. 10, transmit data TX is sent just after a preamble signal. When an offset detected between the number of "H" transmit data and that of "L" transmit data exceeds a predetermined threshold, the detector 53 is started up so as to move the PLL into open loop control (at t5). Although the predetermined threshold is not a specially decided one, it should preferably be a value within a range in which the value does not affect the PLL high pass filter, that is, about 10 times the PLL loop band. When the FM transmitter is used for a short range wireless LAN, the value should preferably be a period of 100 kHz or higher. Consequently, about 10 threshold values are used in this embodiment. Such a configuration of the controller makes it possible to delay a starting point of time t5 for open loop control later than when the controller 14 is used in the second embodiment. In FIG. 10, t3 denotes a preamble transmission starting point of time, t4 denotes a preamble transmission ending point of time, and t5 denotes a transmit data transmission starting point of time.

Figure 11:
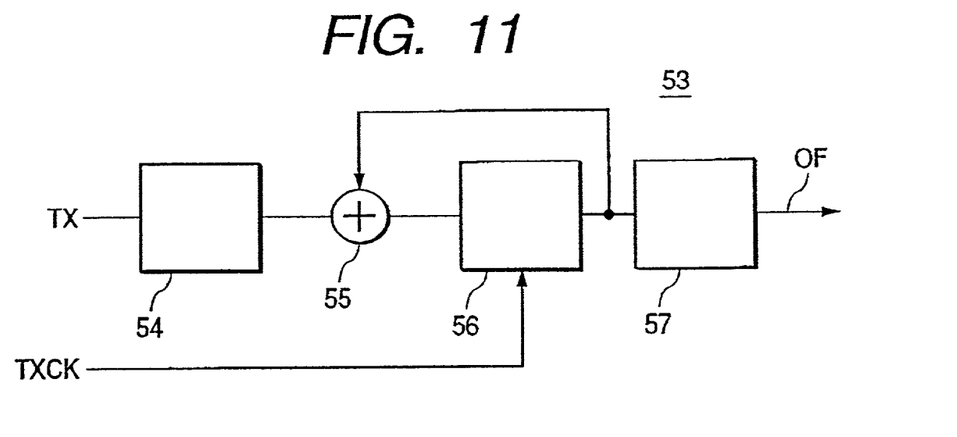
FIG. 11 is a block diagram of the offset detector shown in FIG. 9.

FIG. 11 shows a configuration of the offset detector 53. The offset detector 53 is composed of a code converter 54, an adder 55, a data latch 56, and a detector 57. The operation of the detector 53 composed in this manner will become as follows. The code converter 54 generates "+1" and "−1" corresponding to received "H" and "L" transmit data. The adder 55 and the data latch 56 are combined so as to compose an integrator for integrating received data every synchronization clock TXCK. The detector 57 calculates an absolute value of the output from the data latch 56 and outputs an offset detection signal OF when the absolute value exceeds a predetermined threshold.

As described clearly in the above embodiments, according to the present invention, it is possible to control start and idle of each of the buffer amplifier and the PLL together in the FM transmitter, there is no need to employ a sample-and-hold circuit. Therefore, the power consumption of the FM transmitter can be reduced.

Furthermore, because it is possible to transmit a transmission preamble signal with the PLL that is carrying out closed loop control in a preamble transmission period, a delayed buffer amplifier start-up timing can be specified. Consequently, the buffer amplifier active time can be reduced, whereby the power consumption of the FM transmitter can be reduced.

Furthermore, with a detector that can integrate transmit data, data can be transmitted in a closed loop in a case where there is no offset in the data. Therefore, the buffer amplifier active time can further be reduced.

The foregoing invention has been described in terms of preferred embodiments. However, those skilled in the art will recognize that many variations of such embodiments exist. Such variations are intended to be within the scope of the present invention and the appended claims.

What is claimed is:

1. An FM transmitter, comprising:
   a phase lock loop including a charging pump,
   wherein said phase lock loop includes a phase comparator, a loop filter, a voltage controlled oscillator, and a counter;
   an adder to add up a frequency shift to a signal of said phase lock loop, said frequency shift corresponding to a transmission signal;
   a controller to receive a signal regarding start and idle of said phase lock loop, and to output a control signal to control an output of said charging pump; and
   a buffer amplifier to input a signal from said phase loop look and to output a signal to an antenna,
   wherein said controller is coupled to further receive a start/idle signal of said buffer amplifier and to output a control signal to hold an output of said charging pump in a high resistance state, and
   wherein said phase lock loop is controlled so as to be held in closed loop control for a period from a start-up timing of said phase lock loop, and held in open loop control for other periods.

2. The FM transmitter according to claim 1,
   wherein said controller comprises:
   a delay circuit to delay a start/idle signal of said buffer amplifier; and
   a flip-flop circuit to receive an output of said delay circuit at one input terminal and a start/idle signal of said phase lock loop at the other input terminal, said flip-flop circuit being set by said start/idle signal of said phase lock loop and reset by said output of said delay circuit, and
   wherein said phase lock loop is controlled so as to be held in closed loop control between the start-up timing of said phase lock loop and a timing delayed by a certain time from said start-up of said buffer amplifier.

3. The FM transmitter according to claim 2,
   wherein said charging pump is provided with a logical circuit to suppress a frequency control signal output from said phase comparator according to a control signal output from said controller.

4. The FM transmitter according to claim 2,
   wherein said charging pump is provided with a switch to reset a bias current to zero according to a control signal output from said controller.

5. The FM transmitter according to claim 1,
   wherein said controller comprises a preamble detector to detect a preamble signal included in said transmission signal and a flip-flop circuit to be set by said start/idle signal of said phase lock loop and reset by said output of said preamble detector, and
   wherein said phase lock loop is controlled so as to be held in closed loop control between the start-up timing of said phase lock loop and a transmission timing of said preamble signal.

6. The FM transmitter according to claim 5,
   wherein said charging pump is provided with a logical circuit to suppress a frequency control signal output from said phase comparator according to a control signal output from said controller.

7. The FM transmitter according to claim 5,
   wherein said charging pump is provided with a switch to reset a bias current to zero according to a control signal output from said controller.

8. The FM transmitter according to claim 1,
   wherein said charging pump is provided with a logical circuit to suppress a frequency control signal output from said phase comparator according to a control signal output from said controller.

9. The FM transmitter according to claim 1,
   wherein said charging pump is provided with a switch to reset a bias current to zero according to a control signal output from said controller.

10. The FM transmitter according to claim 1, wherein said controller comprises:

an offset detector to detect an offset of the number of "H" or "L " generated transmission signals, said offset detector detecting whether an absolute integration value that denotes said offset of the number of generated "H" or "L" transmission signals, obtained by integrating said transmission signals, exceeds a predetermined threshold; and a flip-flop circuit to be set by said start/idle signal of said phase lock loop and reset by said output of said offset detector, and wherein said phase lock loop is controlled so as to be held in closed loop control between a phase lock loop start-up timing and a timing of detection of said predetermined threshold exceeded by said offset of the number of "H" or "L" generated transmission signals by said offset detector and to be held in open loop control in other periods.

11. A transmitter to transmit a signal with FM modulation, wherein the transmitter receives a start/idle signal of a phase lock loop circuit and a start/idle signal of a buffer amplifier, and outputs a control signal to hold an output of a charging pump at a first level of resistance at which a bias current is substantially zero, wherein said phase lock loop circuit is moved into open loop control when the output of the charge pump is held at the first level of resistance, and wherein said signal to be transmitted has a preamble, and said phase lock loop circuit is controlled for the loop to be closed or opened based on said preamble.

12. A transmitter to transmit a signal with FM modulation, wherein the transmitter receives a start/idle signal of a phase lock loop circuit and a start/idle signal of a buffer amplifier, and outputs a control signal to hold an output of a charging pump at a first level of resistance at which a bias current is substantially zero, wherein said phase lock loop circuit is moved into open loop control when the output of the charge pump is held at the first level of resistance, wherein said transmitter includes a controller comprising:

a delay circuit to delay a start/idle signal of said buffer amplifier; and a flip-flop circuit to receive an output of said delay circuit at one input terminal and a start/idle signal of said phase lock loop at the other input terminal, said flip-flop circuit being set by said start/idle signal of said phase lock loop and reset by said output of said delay circuit, and wherein said phase lock loop is controlled so as to be held in closed loop control between a start-up timing of said phase lock loop and a timing delayed by a certain time from said start-up of said buffer amplifier, and held in open loop control in other periods.

13. A transmitter to transmit a signal with FM modulation, wherein the transmitter receives a start/idle signal of a phase lock loop circuit and a start/idle signal of a buffer amplifier, and outputs a control signal to hold an output of a charging pump at a first level of resistance at which a bias current is substantially zero, wherein said phase lock loop circuit is moved into open loop control when the output of the charge pump is held at the first level of resistance, wherein said transmitter includes a controller comprising a preamble detector to detect a preamble signal included in said transmission signal and a flip-flop circuit to be set by said start/idle signal of said phase lock loop and reset by said output of said preamble detector, and wherein said phase lock loop is controlled so as to be held in closed loop control between a start-up timing of said phase lock loop and a transmission timing of said preamble signal, and held in open loop control in other periods.

* * * * *